US012072256B2

(12) United States Patent
Kobayashi et al.

(10) Patent No.: US 12,072,256 B2
(45) Date of Patent: Aug. 27, 2024

(54) PRESSURE SENSOR DEVICE

(71) Applicant: TDK CORPORATION, Tokyo (JP)

(72) Inventors: Masanori Kobayashi, Tokyo (JP); Ken Unno, Tokyo (JP); Tetsuya Sasahara, Tokyo (JP); Kohei Nawaoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 211 days.

(21) Appl. No.: 17/639,167

(22) PCT Filed: Aug. 28, 2020

(86) PCT No.: PCT/JP2020/032661
§ 371 (c)(1),
(2) Date: Feb. 28, 2022

(87) PCT Pub. No.: WO2021/049328
PCT Pub. Date: Mar. 18, 2021

(65) Prior Publication Data
US 2022/0291068 A1 Sep. 15, 2022

(30) Foreign Application Priority Data

Sep. 9, 2019 (JP) ................. 2019-164000

(51) Int. Cl.
*G01L 19/14* (2006.01)
*G01L 9/00* (2006.01)
*G01L 9/04* (2006.01)

(52) U.S. Cl.
CPC .............. *G01L 19/147* (2013.01); *G01L 9/04* (2013.01); *G01L 9/0047* (2013.01);
(Continued)

(58) Field of Classification Search
CPC ....... G01L 19/147; G01L 9/04; G01L 9/0047; G01L 9/0048; G01L 9/0055; G01L 19/143
See application file for complete search history.

(56) References Cited

U.S. PATENT DOCUMENTS 5,167,158 A * 12/1992 Kamachi ............... G01L 9/0055
73/706
5,867,886 A * 2/1999 Ratell .................... G01L 9/0055
29/595
(Continued)

FOREIGN PATENT DOCUMENTS

JP S54-100694 U 7/1979
JP H03-107736 A 5/1991
(Continued)

OTHER PUBLICATIONS

Mar. 9, 2022 International Preliminary Report on Patentability issued in International Patent Application No. PCT/JP2020/032661.
(Continued)

*Primary Examiner* — Ryan D Walsh
(74) *Attorney, Agent, or Firm* — Oliff PLC

(57) ABSTRACT

A sensor element suitable for miniaturization. This pressure sensor element has: a metal plate; an insulating film provided on a first surface, which is one surface of the metal plate, so as to form a covered region in which the first plate is covered and an exposed region in which the first surface is exposed; and a pressure detection circuit formed on the insulating film so as to be insulated from the first surface by means of the insulating film.

7 Claims, 12 Drawing Sheets

(52) U.S. Cl.
CPC .......... *G01L 9/0048* (2013.01); *G01L 9/0055* (2013.01); *G01L 19/143* (2013.01)

(56) References Cited

U.S. PATENT DOCUMENTS

| | | | |
|---|---|---|---|
| 6,474,170 | B1 | 11/2002 | Yamagishi et al. |
| 7,260,994 | B2* | 8/2007 | Oboodi ................. G01L 9/0055 361/283.1 |
| 7,647,833 | B1 | 1/2010 | Oboodi et al. |
| 2008/0060441 | A1* | 3/2008 | Toyoda ................... G01L 19/04 73/723 |
| 2008/0210013 | A1 | 9/2008 | Meehan et al. |
| 2010/0065961 | A1* | 3/2010 | Elian ..................... H01L 23/055 257/E23.181 |
| 2022/0155166 | A1* | 5/2022 | Kobayashi .............. G01L 19/06 |

FOREIGN PATENT DOCUMENTS

| | | | | |
|---|---|---|---|---|
| JP | H06-137979 | A | | 5/1994 |
| JP | H10-009982 | A | | 1/1998 |
| JP | H11-173930 | A | | 7/1999 |
| JP | 2001-324402 | A | | 11/2001 |
| JP | 2001343300 | A | * | 12/2001 ........... G01L 9/0055 |
| JP | 2005-114494 | A | | 4/2005 |
| JP | 2005-265784 | A | | 9/2005 |
| JP | 2009063361 | A | * | 3/2009 ......... G01L 19/0038 |
| WO | WO-2021049245 | A1 | * | 3/2021 ............. G01L 15/00 |

OTHER PUBLICATIONS

Aug. 31, 2023 Extended European Search Report issued in European Patent Application No. 20863744.7.

* cited by examiner

PRESSURE SENSOR DEVICE

TECHNICAL FIELD

The present invention relates to a pressure sensor device including a pressure detection circuit.

BACKGROUND

As a pressure sensor, a pressure sensor having a pressure detection circuit formed on an outer bottom surface of a stem, which is a metal member having a bottomed tubular shape, with an insulating film interposed therebetween is known. The above-described pressure sensor is used with the stem fixed to a pipe end with a caulking member or the like, and thereby has good durability even under a high temperature and high pressure environment (see Patent Literature 1 or the like).

However, the conventional pressure sensor with the stem having the bottomed tubular shape has a problem in terms of size reduction. This is because dimensions of the stem that can be formed with high accuracy are limited, and a caulking member or the like is necessary for fixing.

While a pressure sensor device that does not use a stem has been suggested, this pressure sensor device also has a problem (see Patent Literature 2 or the like) in terms of reduction of the entire size of the sensor including a fixing member, because a frame (e.g., outer frame) is necessary to sandwich a metal base to fix it.

Patent Literature 1: JP Patent Application Laid Open No. 2001-324402

Patent Literature 2: JP Patent Application Laid Open No. H06-137979

SUMMARY

The present invention has been achieved under such circumstances and provides a sensor device suitable for size reduction.

To achieve the above object, a pressure sensor device according to the present invention comprises a metal plate;

an insulating film provided on one surface, a first surface, of the metal plate so as to form a covered region where the first surface is covered and an exposed region where the first surface is exposed; and a pressure detection circuit formed on the insulating film so as to be insulated from the first surface by the insulating film.

In the pressure sensor device according to the present invention, the insulating film is formed on the metal plate, and the pressure detection circuit is formed on the insulating film. The pressure sensor device including a base material and the detection circuit can thus be reduced in size, in comparison to a pressure sensor with a stem. Also, with the exposed region where the first surface of the metal plate is exposed provided, it is possible to perform electric conduction processing (e.g., resistance welding) for the metal plate from the first surface of the metal plate in the above-described pressure sensor device. Therefore, the above-described pressure sensor device can be easily fixed to a housing or the like through welding or other method, without using a frame (e.g., outer frame), enabling size reduction of the shape of an entire unit.

Additionally, for example, a second surface opposite the first surface of the metal plate may include a welded portion welded to the housing.

The pressure sensor is fixed to the housing at the welded portion, thereby enabling size reduction compared to a conventional pressure sensor device fixed with a member (e.g., outer frame). Additionally, because the pressure sensor is fixed by welding, the pressure sensor has good durability under a high temperature environment. The welded portion being provided on the second surface is also advantageous to size reduction because no fixing member is disposed around an outer periphery of the metal plate.

Additionally, for example, at least a part of the welded portion overlaps with the exposed region when seen from a direction orthogonal to the first surface.

In the above-described pressure sensor device, the welded portion on the second surface can be formed by touching an electrode for electric conduction processing to a part of the first surface close to the welded portion. The welded portion of the above-described pressure sensor device thus has a good accuracy of formation.

Additionally, for example, the exposed region may continue in a circumferential direction so as to surround a part where the pressure detection circuit is formed in the covered region.

In the above-described pressure sensor device, the welded portion on the second surface can be formed by touching an electrode for electric conduction processing to a part of the first surface close to the welded portion. The welded portion of the above-described pressure sensor device can thus be formed with accuracy so as to surround a pressure receiving area on the second surface opposite a part of the first surface where the pressure detection circuit is formed.

Additionally, for example, a recess sinking toward the first surface side may be formed on the second surface opposite the first surface of the metal plate.

The above-described pressure sensor device can have increased sensitivity of the sensor.

Additionally, for example, a protruding portion protruding toward an opposite side of the first surface side may be formed on the second surface opposite the first surface of the metal plate, and the welded portion may be formed on the protruding portion.

Additionally, for example, an inclined surface inclined from a center side to the outer periphery side, toward the first surface side, may be formed on the second surface opposite the first surface of the metal plate, and the welded portion may be formed on the inclined surface.

Additionally, for example, in the pressure sensor device according to the present invention, the metal plate may include an outer peripheral portion having a thickness thinner than that on the center side, a stepped portion in a step-like form from the center side to the outer peripheral portion may be formed on the second surface opposite the first surface of the metal plate, and the welded portion may be formed on the stepped portion.

The welded portion of the above-described pressure sensor device can be formed with accuracy.

BRIEF DESCRIPTION OF THE DRAWING(S)

DETAILED DESCRIPTION

Hereinafter, the present invention is described based on embodiments shown in figures.

First Embodiment

Figure 1:
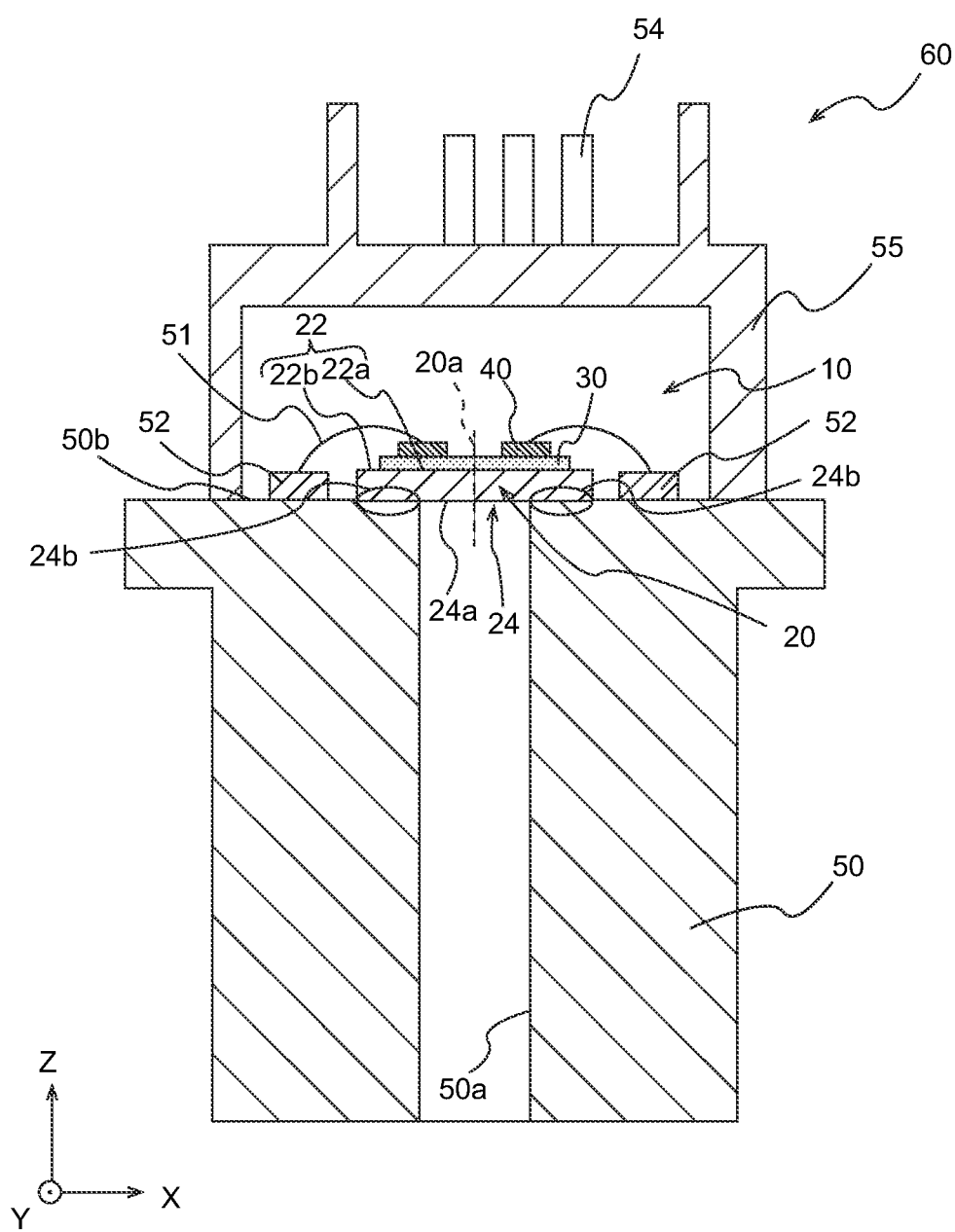
FIG. 1 is a schematic cross-sectional view of a pressure sensor device according to First Embodiment of the present invention and parts surrounding the pressure sensor device.

FIG. 1 is a schematic cross-sectional view of a pressure sensor unit 60 including a pressure sensor device 10 according to First Embodiment of the present invention. The pressure sensor unit 60 includes a housing 50, a printed circuit board 52, a connector 54, a cover member 55, and the like, other than the pressure sensor device 10.

The pressure sensor device 10 is fixed to an end surface of the housing 50 as shown in FIG. 1. The housing 50 has a tubular shape, and a passage 50a is formed inside the housing 50. The passage 50a airtightly communicates with a pressure chamber filled with fluid as a measurement target.

The material of the housing 50 is not limited and is, for example, a metal material (e.g., stainless steel), ceramics (e.g., silicon carbide), or a semiconductor material (e.g., silicon).

A metal plate 20 of the pressure sensor device 10 seals an end of the passage 50a of the housing 50 as shown in FIG. 1. This forms a pressure receiving area 24a, which receives a pressure of the fluid, on a second surface 24, which is a bottom surface of the metal plate 20.

The printed circuit board 52 is fixed to the end surface of the housing 50. The printed circuit board 52 is disposed on an outer periphery side of the pressure sensor device 10. The printed circuit board 52 electrically connects with a pressure detection circuit 40 of the pressure sensor device 10 via a wiring member 51. The wiring member 51 is formed by, for example, wire bonding.

On the end surface of the housing 50, the cover member 55 covering the pressure sensor device 10 and the printed circuit board 52 is provided. The pressure sensor device 10 is stored in a space between the housing 50 and the cover member 55.

On the cover member 55, the connector 54, which connects the pressure sensor unit 60 with an external controller, a power supply, or the like is provided. Electric power, a control signal, or the like is transmitted to the pressure sensor device 10 and the printed circuit board 52 included in the pressure sensor unit 60 via the connector 54. Also, a detection signal detected by the pressure sensor device 10, a signal calculated by the printed circuit board 52 using the detection signal, or the like is transmitted to an external destination via the connector 54.

The shapes of the housing 50, the cover member 55, and the connector 54 included in the pressure sensor unit 60 are not limited to the shapes shown in FIG. 1, and can be appropriately changed based on a measurement target of the pressure sensor device 10. For example, the housing 50 included in the pressure sensor unit 60 may partly be used for plumbing. A connector member that connects to an external destination may be formed on the printed circuit board 52 of the pressure sensor unit 60, and/or, the cover member 55 may be omitted.

Figure 2:
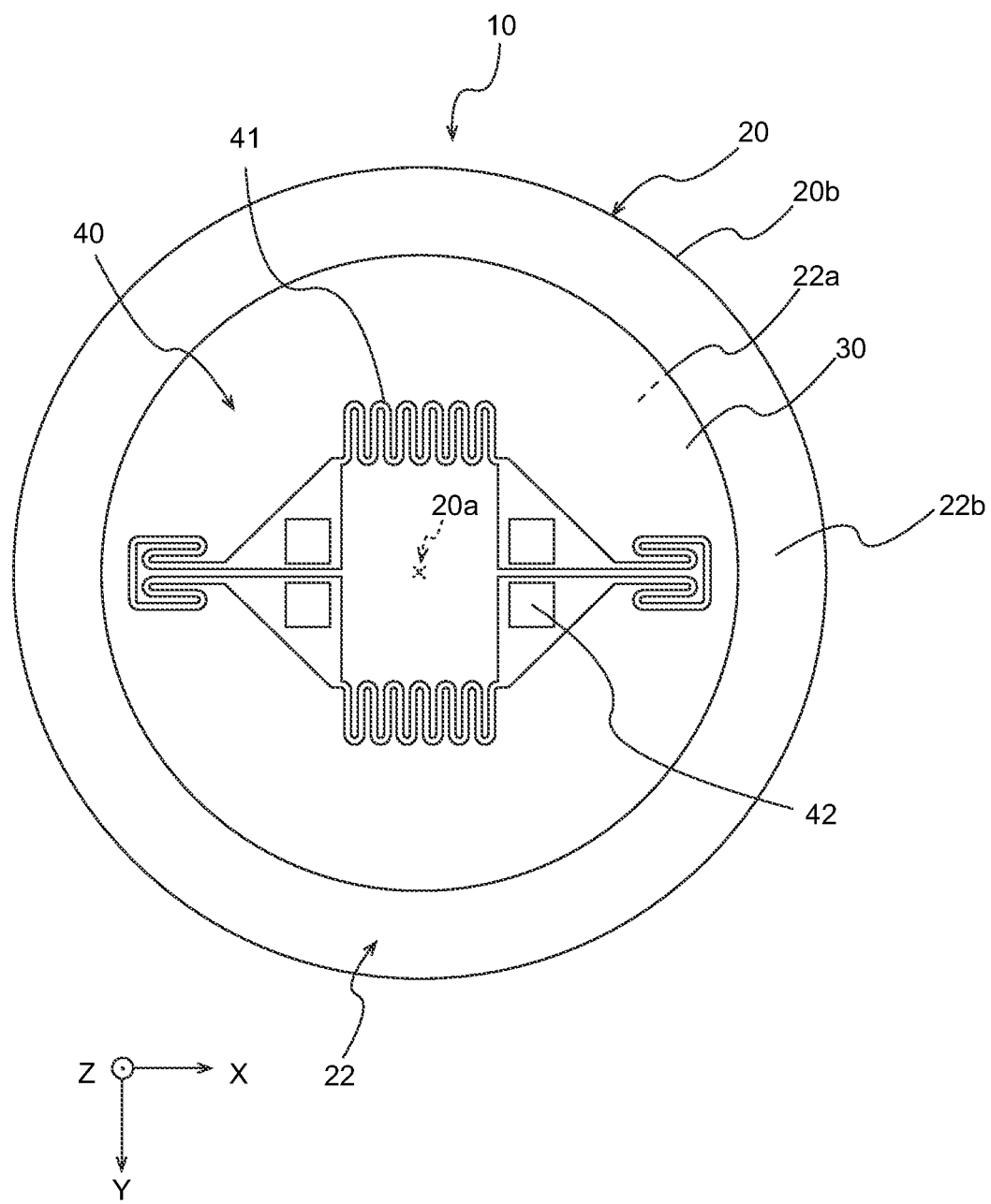
FIG. 2 is a top view of the pressure sensor device shown in FIG. 1 seen from above.
Figure 3:
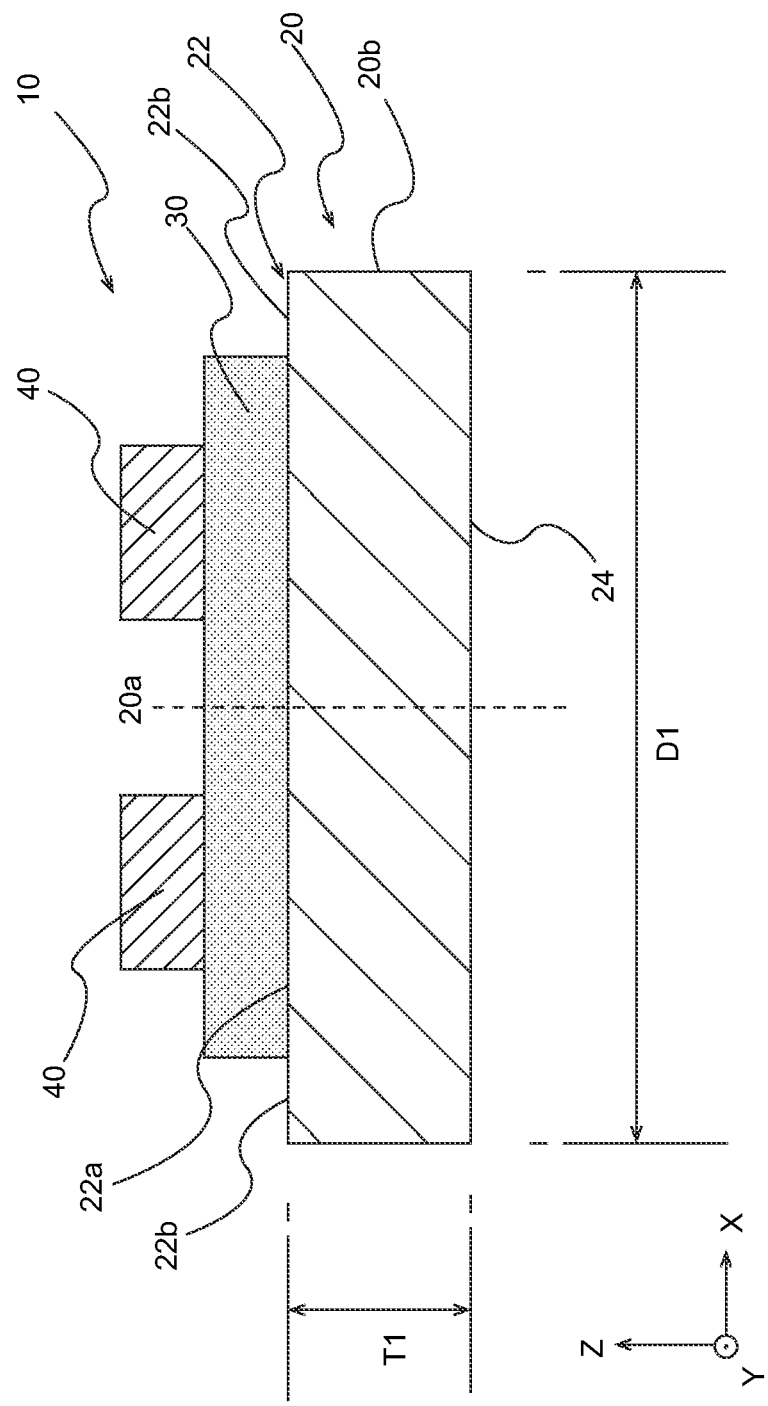
FIG. 3 is a schematic cross-sectional view of the pressure sensor device shown in FIG. 2.

FIG. 2 is a top view of the pressure sensor device 10 included in the pressure sensor unit 60 shown in FIG.1 seen from above. FIG. 3 is a schematic cross-sectional view of the pressure sensor device 10. As shown in FIG. 3, the pressure sensor device 10 includes the metal plate 20, an insulating film 30 provided on a first surface 22 which is one surface of the metal plate 20, and the pressure detection circuit 40 formed on the insulating film 30.

In providing the description of the pressure sensor device 10, a lamination direction of the metal plate 20, the insulating film 30, and the pressure detection circuit is defined as a Z-axis direction, and directions that are perpendicular to the Z-axis direction and are perpendicular to each other are defined as an X-axis direction and a Y-axis direction. The first surface 22 of the metal plate 20 is equivalent to a top surface (a surface on the positive direction of the Z-axis) of the metal plate 20.

While the metal plate 20 has a disc shape as shown in FIGS. 2 and 3, the shape of the metal plate 20 is not limited to the disc shape and may be oval, rectangular, or the like. Details of the shape of the metal plate 20 are described later.

The material of the metal plate 20 is not limited as long as appropriate elastic deformation of the material occurs in accordance with a pressure. Examples of the material include simple metals (e.g., Fe, nickel, and aluminum) and alloys such as steel materials (e.g., stainless steel, chromium steel, and carbon steel including the simple metals) and nickel alloys (e.g., Invar and Kovar). The metal plate 20 preferably comprises a conductive material.

The insulating film 30 formed on the first surface 22 of the metal plate 20 covers only a part of the first surface 22 and does not cover the first surface 22 entirely, as shown in FIG. 3. On the first surface 22 of the metal plate 20, a covered region 22a covered with the insulating film 30 and an exposed region 22b where the first surface 22 is exposed are formed.

The insulating film 30 is provided in a center area, near a center 20a, on the first surface 22 as shown in FIG. 3. The center area of the first surface 22 is thus the covered region 22a under the insulating film 30.

On the other hand, the exposed region 22b exposed from the insulating film 30 is formed in close proximity to an outer periphery 20b of the metal plate 20, on the first surface 22, as shown in FIGS. 2 and 3. The exposed region 22b of the pressure sensor device 10 continues in a circumferential direction so as to surround a part where the pressure detection circuit 40 is formed in the covered region 22a, as shown in FIG. 2.

While the exposed region 22b may continue along the outer periphery 20b of the first surface 22 and surround the covered region 22a entirely, the covered region 22a may be partly formed outside the exposed region 22b. The exposed region 22b may also be formed intermittently in the circumferential direction.

The pressure detection circuit 40 is formed on a side of the insulating film 30 on a positive direction of the Z-axis as shown in FIG. 3. Therefore, the pressure detection circuit 40 is insulated from the first surface 22 by the insulating film 30.

As shown in FIG. 2, the pressure detection circuit 40 includes a strain gauge 41 that detects a strain of the metal plate 20, an electrode member 42 that connects with the wiring member 51 connected to the printed circuit board 52 shown in FIG. 1, and the like. The pressure detection circuit 40 may include, for example, a Wheatstone bridge circuit that detects the strain of the metal plate 20 through resistance change or the like. The pressure detection circuit 40, however, is not limited to the Wheatstone bridge circuit.

The material of the insulating film 30 is not limited, and examples of the material include silicon oxide, silicon nitride, and alumina. The insulating film 30 is formed on the first surface 22 of the metal plate 20 with, for example, a sputtering method, a vacuum deposition method, a CVD method, or a sol-gel method. The covered region 22a and the exposed region 22b can be formed on the first surface 22 by masking the exposed region 22b or removing a part of the insulating film 30 after its formation, when the insulating film 30 is formed on the first surface 22 of the metal plate 20.

The pressure detection circuit 40 is formed by subjecting, for example, a functional film including a semiconductor (e.g., silicon), a metal with good conductivity, or the like to laser processing or microfabrication using a semiconductor processing technique (e.g., screen printing). The functional film constituting the detection circuit is formed with, for example, the sputtering method, the vacuum deposition method, the CVD method, and the sol-gel method, on the insulating film 30 formed on the first surface 22. As a patterning method of forming the pressure detection circuit 40 from the functional film, a photo patterning method, which is a semiconductor processing technique, can be used, for example.

Figure 4:
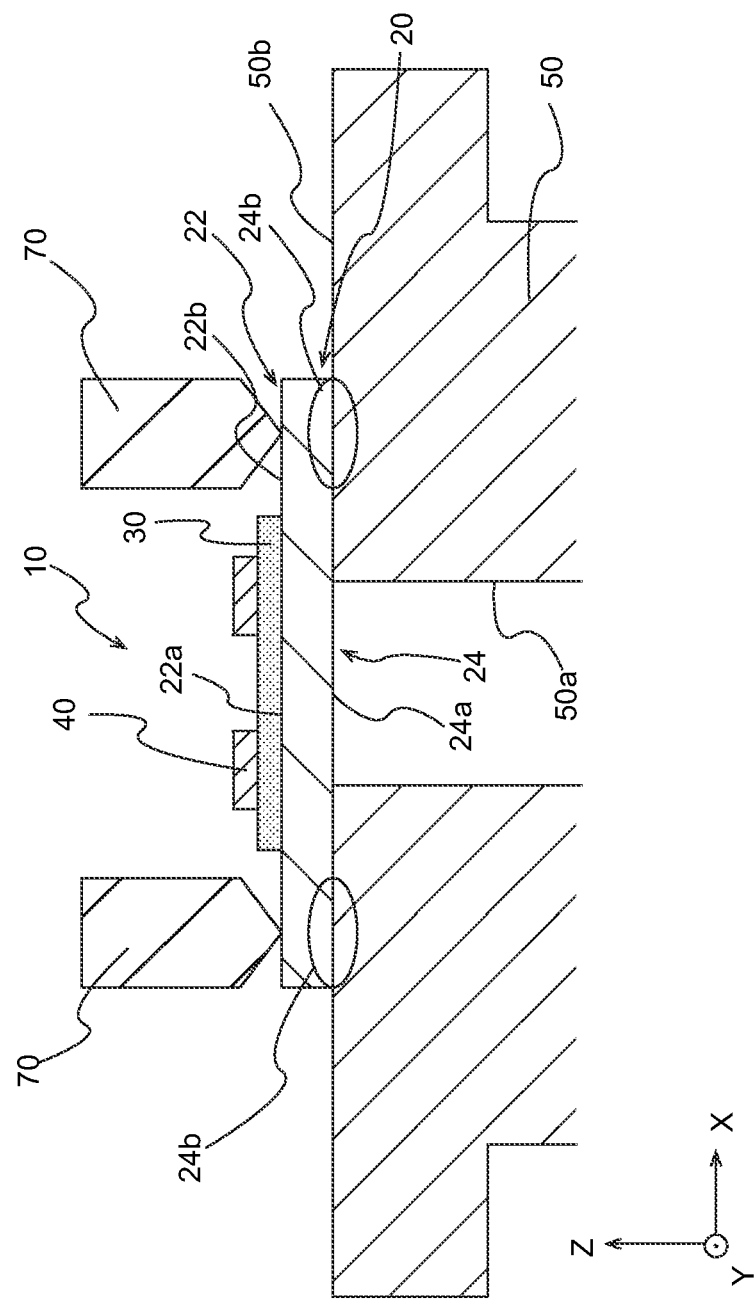
FIG. 4 is a schematic view showing a step of welding the pressure sensor shown in FIG. 2 to a housing.

The pressure sensor device 10 shown in FIGS. 2 and 3 is fixed to a top surface 50b of the housing 50 as shown in FIG. 1. FIG. 4 shows an example of a step of fixing the pressure sensor device 10 to the housing 50. The pressure sensor device 10 can be fixed to the housing 50 by resistance welding as shown in FIG. 4.

The exposed region 22b where the metal plate 20 is exposed is formed on the first surface 22 of the pressure sensor device 10 as shown in FIG. 4. On the second surface 24, which is a surface opposite the first surface 22 of the metal plate 20, the insulating film 30 is not formed, and the metal surface is exposed.

To fix the pressure sensor device 10 to the housing 50, the pressure sensor device 10 is firstly placed on the housing 50 so that the second surface 24 of the pressure sensor device 10 touches the top surface 50b of the housing 50. An electrode for resistance welding is then brought into contact with the exposed region 22b of the first surface 22 of the pressure sensor device 10 to connect the second surface 24 and the top surface 50b electrically, so that the second surface 24 is fixed to the top surface 50b by welding as shown in FIG. 4. This forms a welded portion, which is welded to the housing, on the second surface 24 of the metal plate 20.

With the exposed region 22b exposed from the insulating film 30 formed on the first surface 22 of the pressure sensor device 10, bringing the electrode in contact with the metal plate 20 from the first surface 22 side can fix the second surface 24 to the top surface 50b of the housing 50 easily by resistance welding, as described above.

Seen from a direction orthogonal to the first surface 22 (positive direction of the Z-axis), at least a part of a welded portion 24b overlaps with the exposed region 22b as shown in FIG. 4. This allows for electric conduction processing by bringing the electrode 70 in contact with the first surface 22 right above an area where the welded portion 24b is formed.

With the exposed region 22b continuing in the circumferential direction on the first surface 22 as shown in FIG. 2, the welded portion 24b formed on the second surface 24 can also be formed into a shape continuing in the circumferential direction on the second surface 24 and the top surface 50b easily. Consequently, a gap between the second surface 24 of the metal plate 20 and the top surface 50b of the housing 50 is certainly sealed by the accurately formed welded portion 24b in the pressure sensor device 10, as shown in FIG. 4.

As shown in FIGS. 1 and 4, the pressure receiving area 24a, which faces the passage 50a and receives the pressure of the fluid as the measurement target, is formed in a part surrounded by the welded portion 24b on the second surface 24.

As described above, the second surface 24 of the metal plate 20 of the pressure sensor device 10 can be fixed to the top surface 50b of the housing 50 by resistance welding as shown in FIG. 4 for example. This easily allows for a faster welding speed and automation of the welding step. The pressure sensor device 10 does not require a fixing jig and has a simple shape of the metal plate 20. Consequently, the pressure sensor device 10 is suitable for size reduction, and the productivity of the pressure sensor device 10 is good.

Because the metal plate 20 of the pressure sensor device 10 is fixed by resistance welding, it is possible to reduce strain caused on the metal plate 20 or the like by heat applied upon fixing, compared to when the metal plate 20 is fixed with other welding methods. The welded portion 24b, where the metal plate 20 is fixed to the top surface 50b of the housing 50, is not limited to the one formed by resistance welding. The metal plate 20 may be fixed to the housing 50 at the welded portion formed by, for example, electron-beam welding, ultrasonic welding, seam welding, friction welding, and laser welding.

In the pressure sensor device 10 in which the metal plate 20 is fixed to the housing 50 by welding, a slight gap possibly formed between the second surface 24 and the top surface 50b before welding is sealed with the welded portion 24b. From this perspective as well, productivity of the pressure sensor device 10 including the welded portion 24b is good.

Second Embodiment

Figure 5:
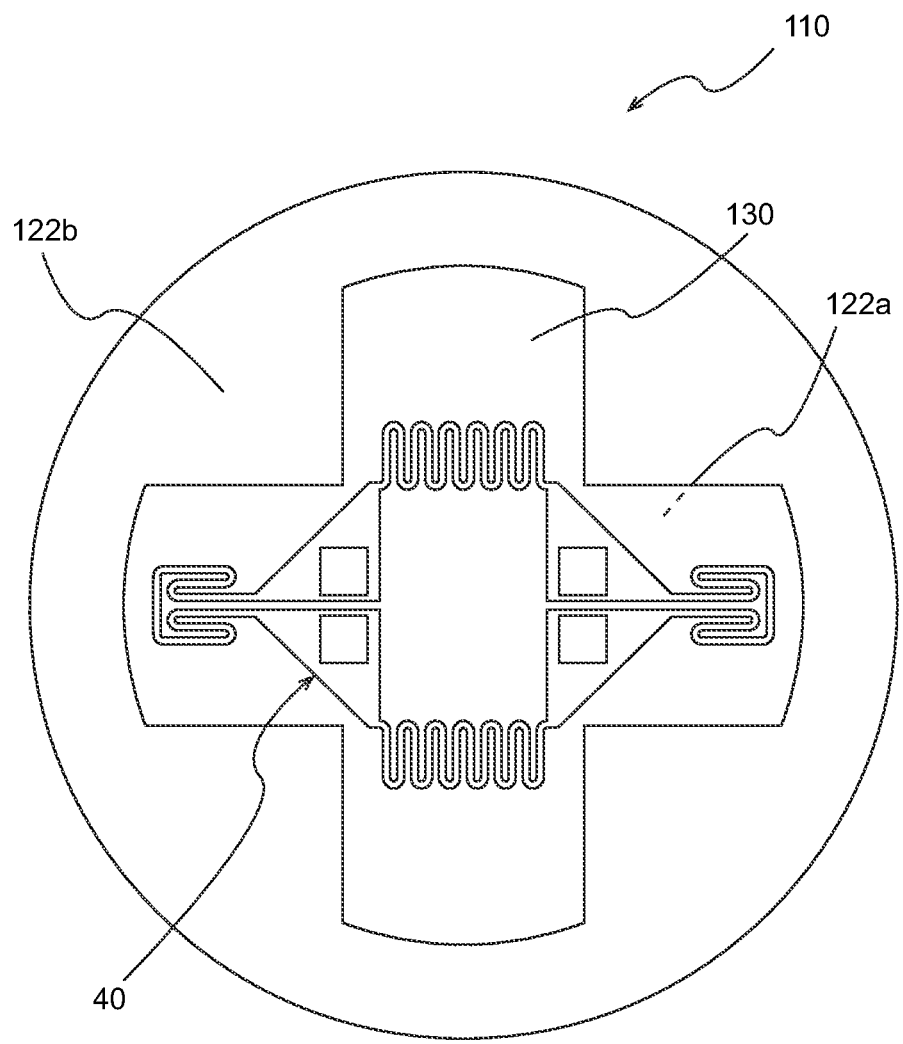
FIG. 5 is a top view of a pressure sensor device according to Second Embodiment of the present invention seen from above.

FIG. 5 is a plan view of a pressure sensor device 110 according to Second Embodiment seen from above. Except for the shape of an insulating film 130, the pressure sensor device 110 according to Second Embodiment is similar to the pressure sensor device 10 (see FIG. 2) according to First Embodiment. In the description of the pressure sensor device 110, only the differences from the pressure sensor device 10 are described, and the similarities with the pressure sensor device 10 are not described.

The insulating film 130 of the pressure sensor device 110 has a cross shape as shown in FIG. 5. As described above, the insulating film 130 is sufficient as long as the pressure detection circuit 40 can be insulated from the metal plate 20, and the shape of the insulating film 130 is not limited to a circular shape, such as that of the insulating film 30 shown in FIG. 2.

The shapes of a covered region 122a and an exposed region 122b formed on a first surface 122 of the metal plate 20 also change in accordance with the shape of the insulating film 130. The pressure sensor device 110 according to Second Embodiment exhibits effects similar to those of the pressure sensor device 10 according to First Embodiment.

Third Embodiment

Figure 6:
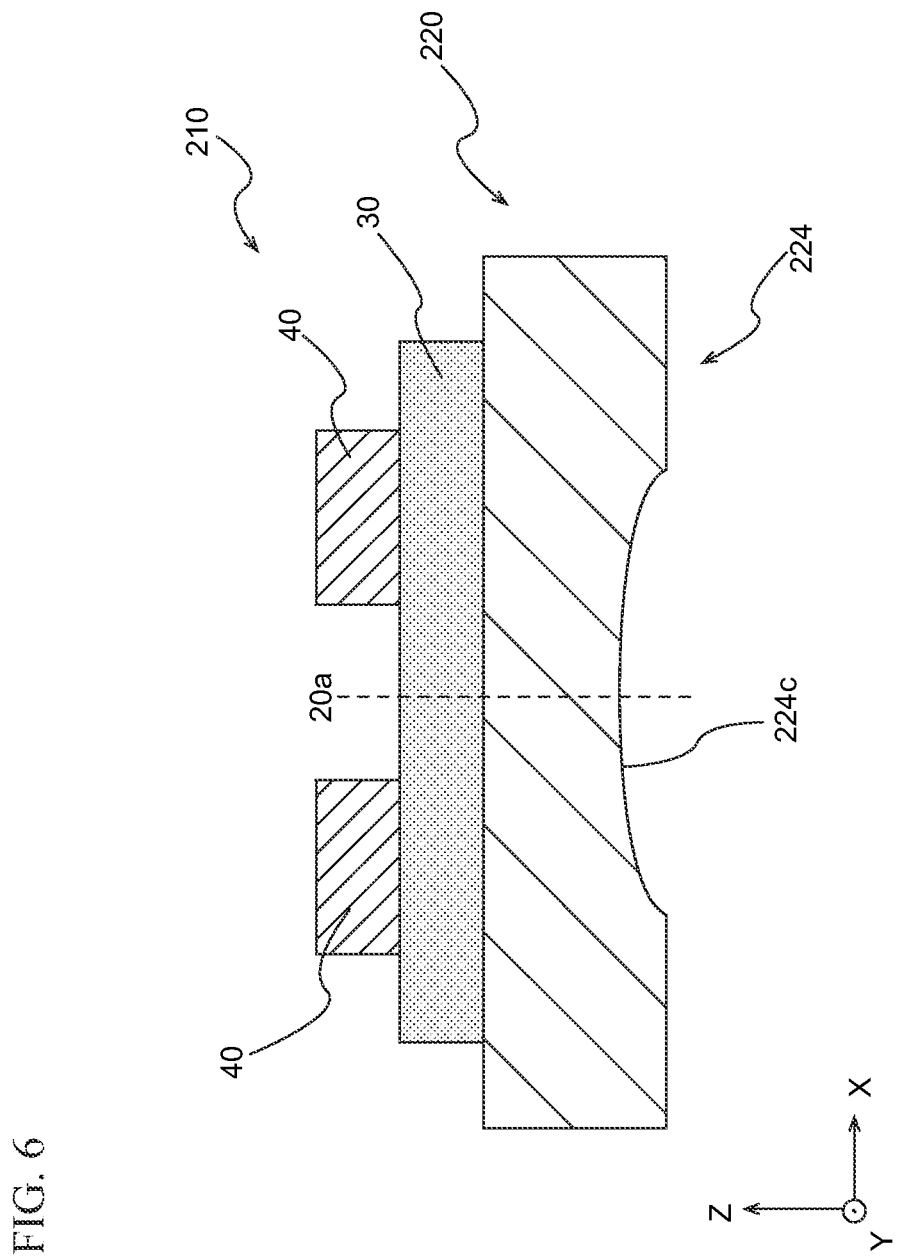
FIG. 6 is a schematic cross-sectional view of a pressure sensor device according to Third Embodiment of the present invention.

FIG. 6 is a schematic cross-sectional view of a pressure sensor device 210 according to Third Embodiment. Except for the shape of a second surface 224 of a metal plate 220, the pressure sensor device 210 according to Third Embodiment is similar to the pressure sensor device 10 (see FIG. 2) according to First Embodiment. In the description of the pressure sensor device 210, only the differences from the pressure sensor device 10 are described, and the similarities with the pressure sensor device 10 are not described.

As shown in FIG. 6, a recess 224c sinking toward the first surface 22 side is formed on the second surface 224 of the metal plate 220 of the pressure sensor device 210. The recess 224c has a curved surface shape with thinner thickness of the metal plate 220 toward the center 20a.

The recess 224c is formed on the second surface 224, at the pressure receiving area (see FIG. 1) facing the passage 50a of the housing 50. On the outer periphery of the recess 224c on the second surface 224, a flat part forming a welded portion welded to the housing 50 is formed.

The recess 224c is formed on the second surface 224 of the pressure sensor device 210 shown in FIG. 6. At the pressure receiving area, the thickness of the metal plate 220 is thin. Consequently, the pressure sensor device 210 allows for increase of sensitivity of the sensor through increase of strain of the metal plate 220 in accordance with a unit pressure change.

The recess 224c may be composed of a curved surface as shown in FIG. 6, but may also be composed of a flat bottom surface and an inclined surface slanted against the bottom surface, or the flat bottom surface and a surface perpendicular to the bottom surface. Other than that, the pressure sensor device 210 according to Third Embodiment exhibits effects similar to those of the pressure sensor device 10 according to First Embodiment.

Fourth Embodiment

Figure 7:
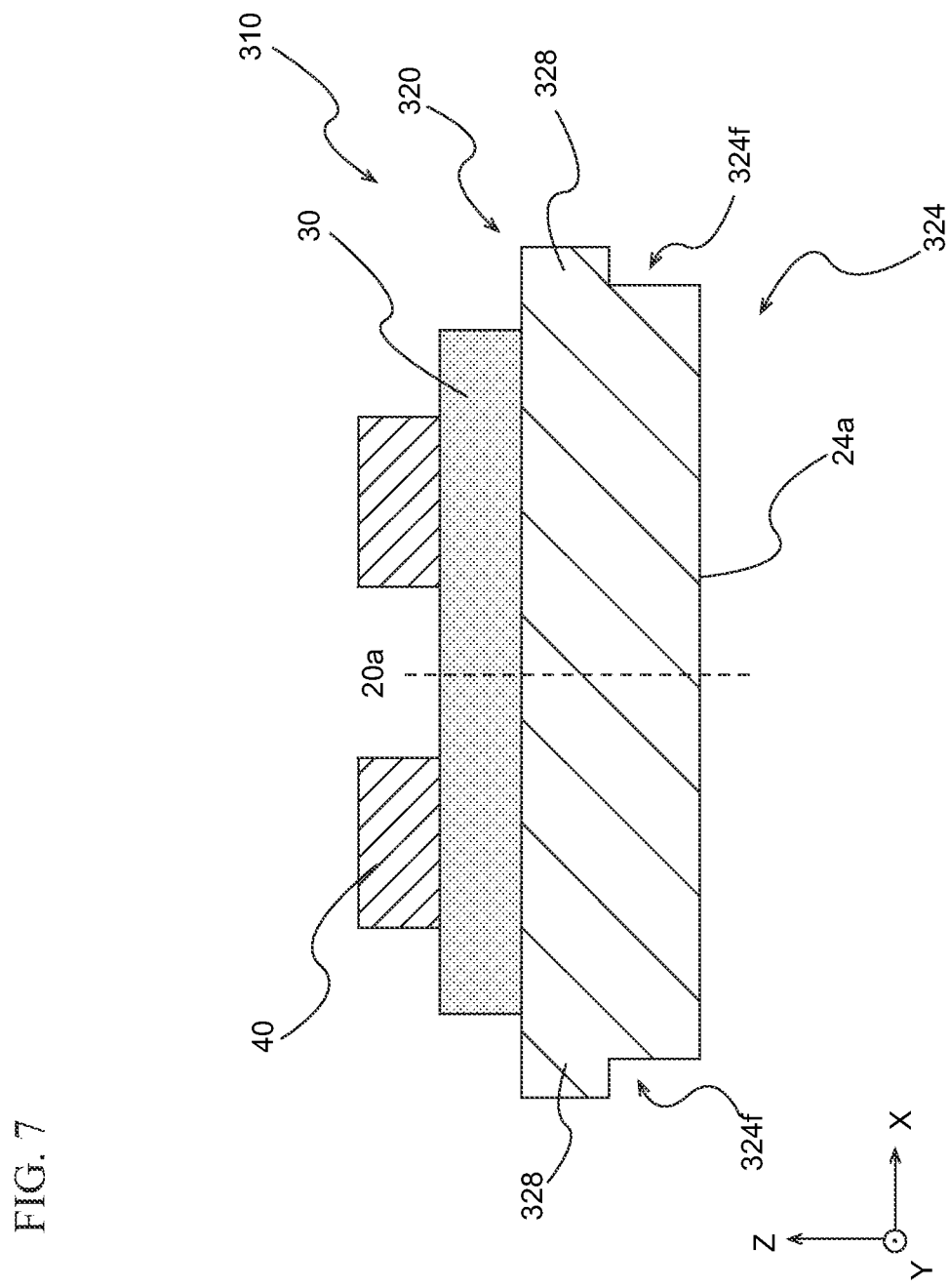
FIG. 7 is a schematic cross-sectional view of a pressure sensor device according to Fourth Embodiment of the present invention.

FIG. 7 is a schematic cross-sectional view of a pressure sensor device 310 according to Fourth Embodiment. Except for the shape of a metal plate 320, the pressure sensor device 310 according to Fourth Embodiment is similar to the pressure sensor device 10 (see FIG. 2) according to First Embodiment. In the description of the pressure sensor device 310, only the differences from the pressure sensor device 10 are described, and the similarities with the pressure sensor device 10 are not described.

As shown in FIG. 7, the metal plate 320 of the pressure sensor device 310 includes an outer peripheral portion 328 with the thickness thinner than the thickness on the center 20a side. On a second surface 324 of the metal plate 320, a stepped portion 324f in a step-like form from the pressure receiving area 24a on the center 20a side to the outer peripheral portion 328 is formed. In the pressure sensor device 310, the welded portion (see FIG. 1) where the metal plate 320 is welded to the housing 50 is formed at the stepped portion 324f.

In the pressure sensor device 310 described above, the stepped portion 324f is welded to the housing 50 (see FIG. 1) including the top surface 50b having a stepped part (not shown in the figure) that engages with the stepped portion 324f. This can form the welded portion accurately and certainly. Other than that, the pressure sensor device 310 according to Fourth Embodiment exhibits effects similar to those of the pressure sensor device 10 according to First Embodiment.

Fifth Embodiment

Figure 8:
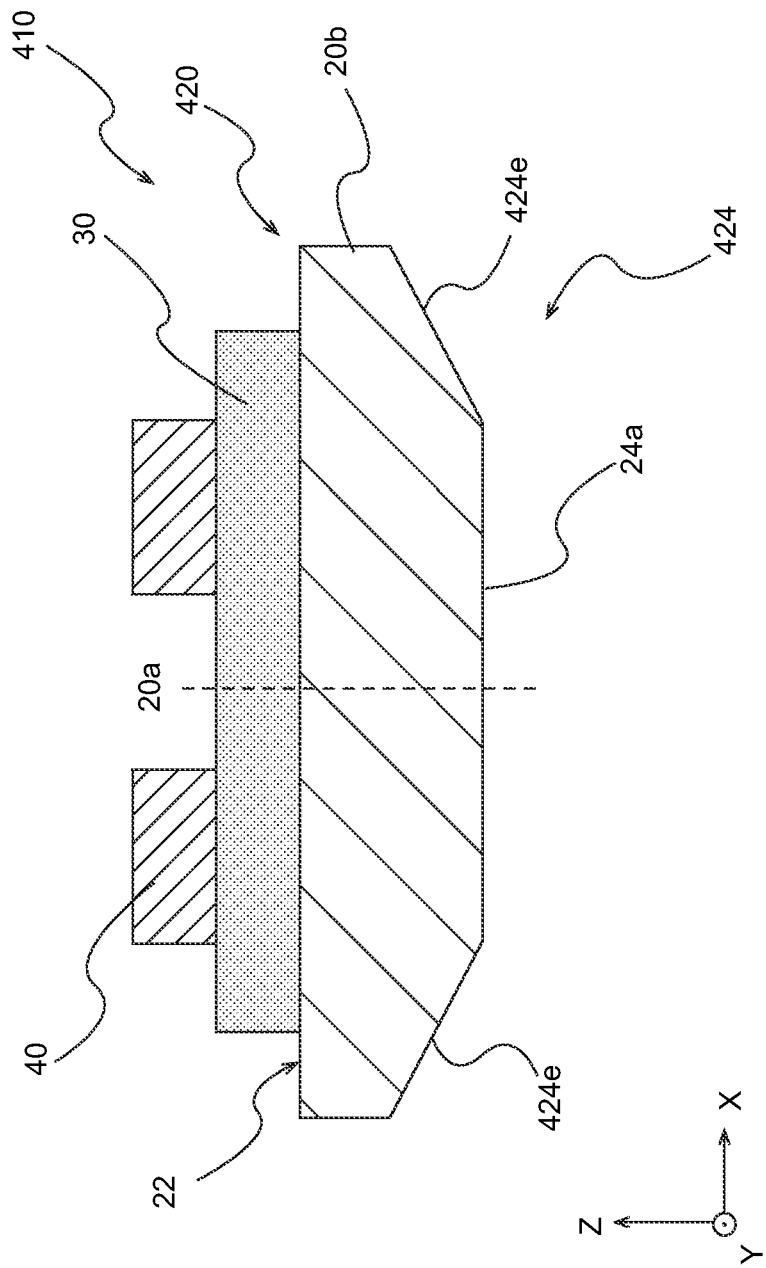
FIG. 8 is a schematic cross-sectional view of a pressure sensor device according to Fifth Embodiment of the present invention.

FIG. 8 is a schematic cross-sectional view of a pressure sensor device 410 according to Fifth Embodiment. Except for the shape of a second surface 424 of a metal plate 420, the pressure sensor device 410 according to Fifth Embodiment is similar to the pressure sensor device 10 (see FIG. 2) according to First Embodiment. In the description of the pressure sensor device 410, only the differences from the pressure sensor device 10 are described, and the similarities with the pressure sensor device 10 are not described.

As shown in FIG. 8, on the second surface 424 of the metal plate 420 of the pressure sensor device 410, an inclined surface 424e inclined from the center 20a side to the outer periphery 20b, toward the first surface 22 side (the positive direction of the Z-axis), is formed. The inclined surface 424e is formed so as to surround the flat pressure receiving area 24a disposed at the center 20a of the second surface 424. The inclined surface 424e continues along an outer periphery of the second surface 424, in a ring-shaped manner. In the pressure sensor device 410, the welded portion (see FIG. 1) where the metal plate 420 is welded to the housing 50 is formed at the inclined surface 424e.

In the pressure sensor device 410 described above, the inclined surface 424e touches a corner (see FIG. 1) between the top surface 50b and the passage 50a of the housing 50 so as to be welded together. This forms the welded portion accurately and certainly. Other than that, the pressure sensor device 410 according to Fifth Embodiment exhibits effects similar to those of the pressure sensor device 10 according to First Embodiment.

Sixth Embodiment

Figure 9:
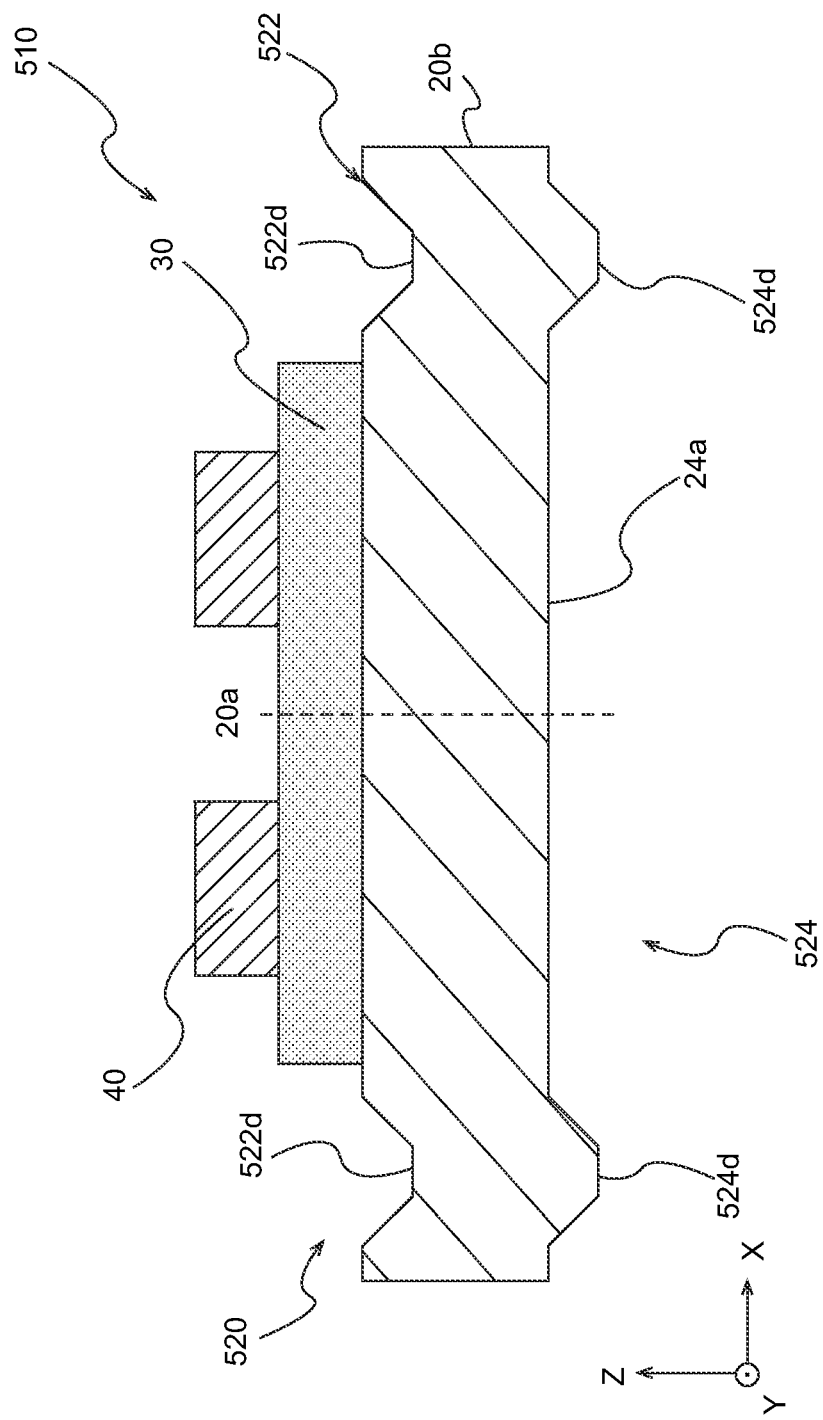
FIG. 9 is a schematic cross-sectional view of a pressure sensor device according to Sixth Embodiment of the present invention.

FIG. 9 is a schematic cross-sectional view of a pressure sensor device 510 according to Sixth Embodiment. Except for the shape of a metal plate 520, the pressure sensor device 510 according to Sixth Embodiment is similar to the pressure sensor device 10 (see FIG. 2) according to First Embodiment. In the description of the pressure sensor device 510, only the differences from the pressure sensor device 10 are described, and the similarities with the pressure sensor device 10 are not described.

As shown in FIG. 9, on a second surface 524 of the metal plate 520 of the pressure sensor device 510, a protruding portion 524d protruding in the negative direction of the Z-axis, towards an opposite side of a first surface 522, is formed. The protruding portion 524d is formed so as to surround the flat pressure receiving area 24a disposed in the vicinity of the center 20a of the second surface 524. The protruding portion 524d continues along the outer periphery 20b of the second surface 524, in a ring-shaped manner. In the pressure sensor device 510, the welded portion (see FIG. 1) where the metal plate 520 is welded to the housing 50 is formed at the protruding portion 524d.

In the pressure sensor device 510 described above, the protruding portion 524d touches the top surface 50b (see FIG. 1) of the housing 50 so as to be welded together. This forms the welded portion accurately and certainly. The protruding portion 524d can be formed, for example, through press-forming the tabular metal plate 20 shown in FIG. 3. In that case, on the first surface 522, a dented portion 522d corresponding to the protruding portion 524d on the second surface 524 is formed. The dented portion 522d described above functions as a mark or a guide for touching an electrode 70 for welding as shown in FIG. 4. Other than that, the pressure sensor device 510 according to Sixth Embodiment exhibits effects similar to those of the pressure sensor device 10 according to First Embodiment.

EXAMPLES

Hereinafter, a pressure sensor device according to the present invention is described in more detail with reference to examples. However, the present invention is not limited to these examples.

Figure 10:
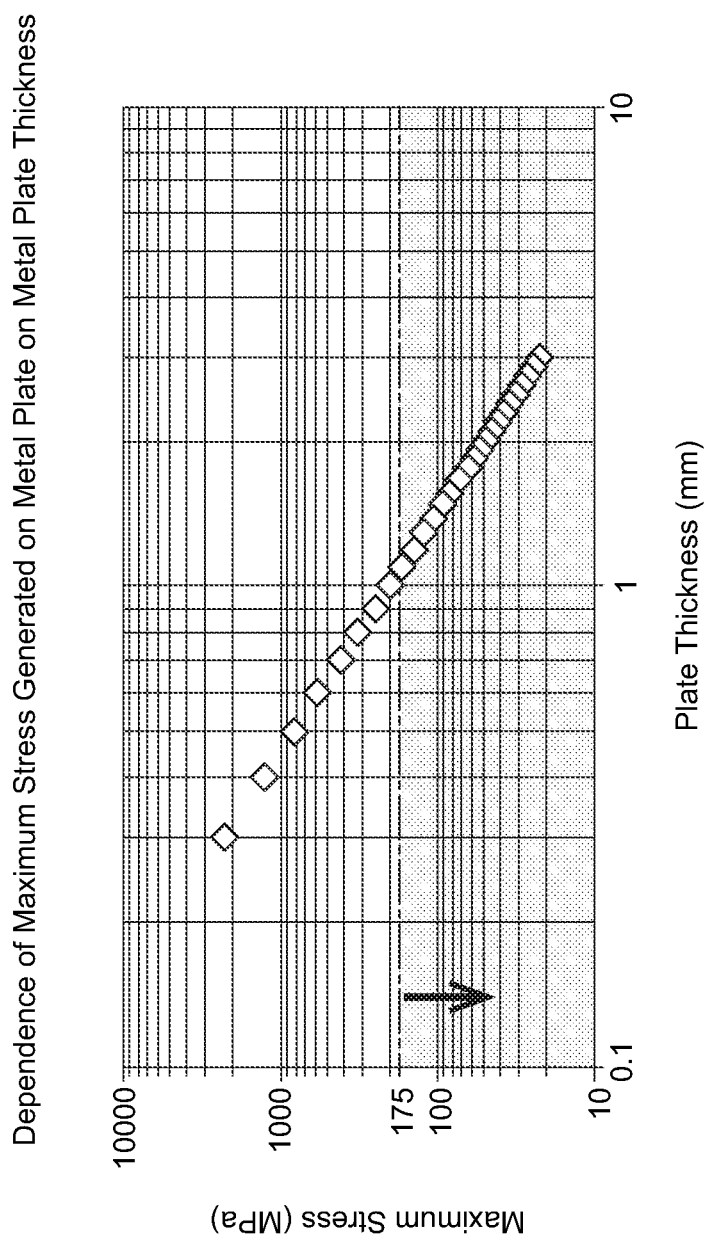
FIG. 10 is a graph showing dependence of a maximum stress generated on a metal plate of a pressure sensor device on a thickness of the metal plate.

FIG. 10 shows a calculated dependence of a maximum stress generated on a metal plate 20 on the plate thickness T1, under application of a predetermined amount of pressure (30 MPa) on a second surface 24 of the metal plate 20 of a pressure sensor device 10 shown in FIG. 3.

In the examples, the diameter D1 (see FIG. 3) of the metal plate 20 was 6 mm, and a model with both ends fixed was used as a mechanical model. The plate thickness T1 (see FIG. 3) was changed within a range of 3.6-10 mm. An assumed material of the metal plate 20 was SUS316L.

From FIG. 10 showing the calculation results, it can be understood that the thinner the thickness of the metal plate 20, the larger the maximum stress generated on the metal plate 20. It can also be understood from FIG. 10 that, with a plate thickness T1 of the metal plate 20 of 1 mm or more, the maximum stress generated on the metal plate 20 was 175 MPa or less, which was the strength of SUS316L.

Figure 11:
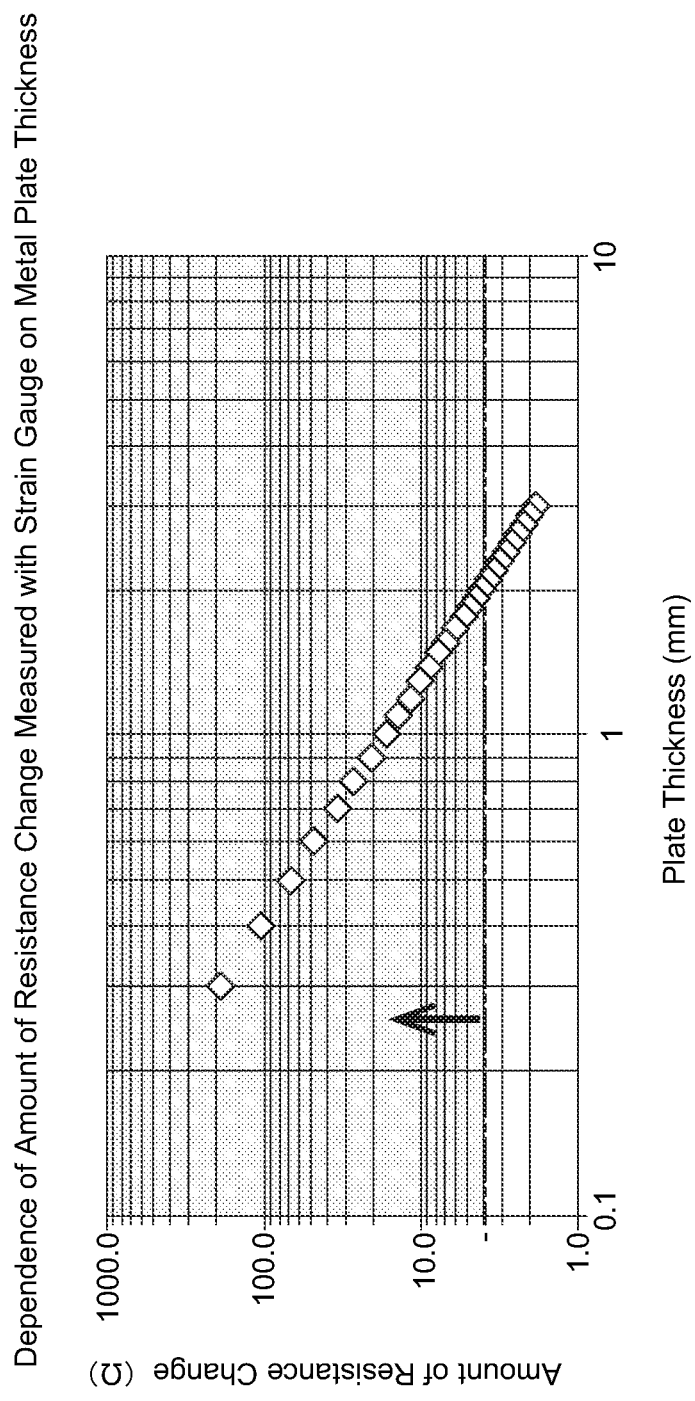
FIG. 11 is a graph showing dependence of an amount of resistance change measured with a strain gauge of a pressure sensor device on a thickness of the metal plate.

FIG. 11 shows a calculated dependence of an amount of resistance change generated in a strain gauge 41 shown in FIG. 2 on the plate thickness T1, under application of the predetermined amount of pressure on the pressure sensor device 10 shown in FIG. 3.

As for a pressure detection circuit 40 including the strain gauge 41 used in the examples, an assumed circuit was a circuit that could detect resistance change with appropriate accuracy when a resistance change of 4Ω or more was caused to the strain gauge 41 with an initial resistance of 1 KΩ. The plate thickness T1 (see FIG. 3) was changed within a range of 3.6-10 mm.

From FIG. 11 showing the calculation results, it can be understood that the thicker the plate thickness T1 of the metal plate 20, the smaller the amount of the resistance change. It can also be understood from FIG. 11 that, with a plate thickness T1 of the metal plate 20 of 2 mm or less, the amount of the resistance change caused on the metal plate 20 was 4Ω or more, which was the resistance change amount that was able to be appropriately detected with the assumed circuit.

From FIGS. 10 and 11, it can be understood that the compact pressure sensor device 10 having suitable durability and optical resolution can be achieved with a plate thickness T1 of 1-2 mm for the metal plate 20 shown in FIG. 1. With the above thickness of the metal plate 20, it is also possible to reduce the entire thickness of the pressure sensor device 10 to, for example, less than 6 mm. The above-described pressure sensor device 10 can be manufactured through a process in a normal standard compliant semiconductor factory, allowing for good productivity.

Figure 12:
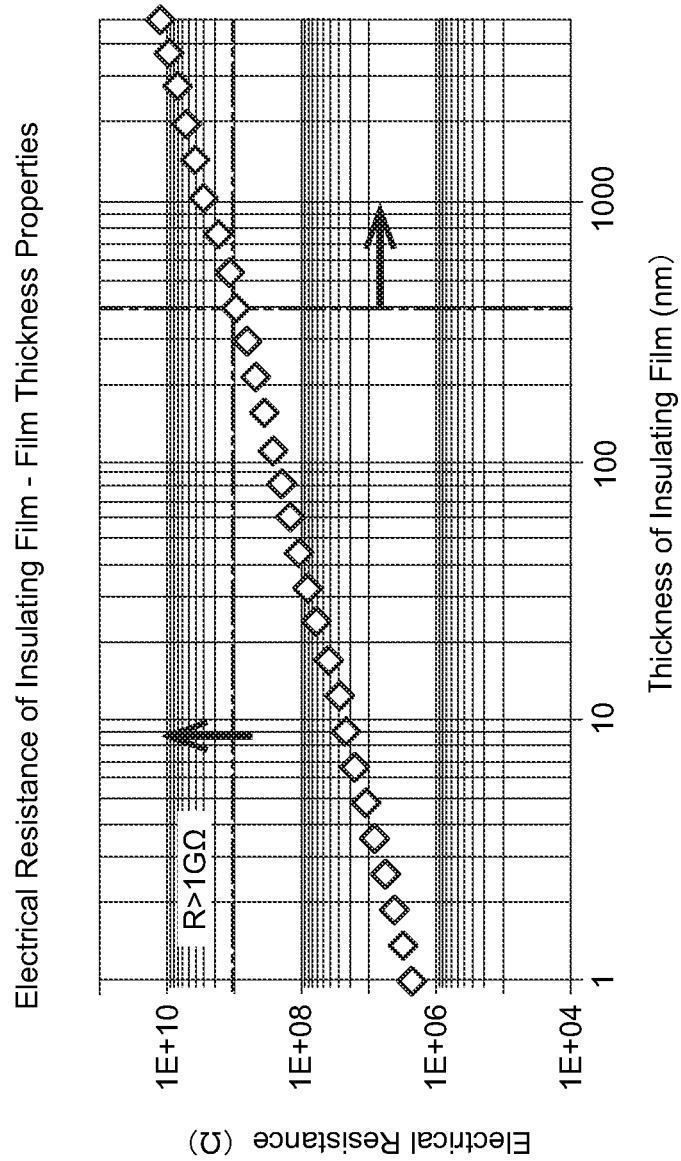
FIG. 12 is a graph showing dependence of electrical resistance of an insulating film of a pressure sensor device on a film thickness.

FIG. 12 shows a calculated dependence of electrical resistance of an insulating film 30 formed on the pressure sensor device 10 shown in FIG. 3 on the film thickness. An assumed material of the insulating film 30 was $SiO_2$, and an assumed film formation method was a gas phase method. According to FIG. 12, with a film thickness of the insulating film 30 of 400 nm, the insulating film 30 can have a resistance of 1 GΩ, allowing for appropriate insulation of the pressure detection circuit 40 from the metal plate 20, which is preferable. The thickness of the pressure detection circuit 40 comprising a functional film is not limited, but is preferably about 0.05-1 μm.

DESCRIPTION OF THE REFERENCE NUMERALS 10, 110, 210, 310, 410, 510 . . . pressure sensor device
20, 220, 420, 520 . . . metal plate
20a . . . center
20b . . . outer periphery
22, 122, 522 . . . first surface
22a, 122a . . . covered region
22b, 122b . . . exposed region
24, 224, 424, 524 . . . second surface
24a . . . pressure receiving area
24b . . . welded portion
30, 130 . . . insulating film
40 . . . pressure detection circuit
41 . . . strain gauge
42 . . . electrode member
50 . . . housing
50a . . . passage
50b . . . top surface
51 . . . wiring member
52 . . . printed circuit board
54 . . . connector
55 . . . cover member
60 . . . pressure sensor unit
70 . . . electrode for welding
224c . . . recess
324f . . . stepped portion
328 . . . outer peripheral portion
424e . . . inclined surface
522d . . . dented portion
524d . . . protruding portion

What is claimed is:

1. A pressure sensor device, comprising:
    a metal plate configured to be deformed in accordance with a pressure;
    an insulating film provided on a first surface of the metal plate so as to form a covered region where the first surface is covered and an exposed region where the first surface is exposed; and
    a pressure detection circuit formed on the insulating film so as to be insulated from the first surface by the insulating film, wherein the pressure detection circuit includes a strain gauge configured to detect a deformation occurring in the metal plate, a second surface of the metal plate opposite the first surface of the metal plate includes a welded portion to be welded to a housing, and at least a part of the welded portion overlaps with the exposed region when seen from a direction orthogonal to the first surface.

2. The pressure sensor device according to claim 1, wherein the exposed region continues in a circumferential direction so as to surround a part where the pressure detection circuit is formed in the covered region.

3. The pressure sensor device according to claim 2, wherein the exposed region continues along an outer periphery of the first surface.

4. The pressure sensor device according to claim 1, wherein a recess sinking toward the first surface side is formed on a second surface opposite the first surface of the metal plate.

5. The pressure sensor device according to claim 1, wherein a protruding portion protruding toward an opposite side of the first surface side is formed on the second surface opposite the first surface of the metal plate;

a dented portion corresponding to the protruding portion on the second surface is formed on the first surface; and the welded portion is formed on the protruding portion.

6. The pressure sensor device according to claim 1, wherein an inclined surface inclined from a center side to the outer periphery side, toward the first surface side, is formed on the second surface opposite the first surface of the metal plate; and the welded portion is formed on the inclined surface.

7. The pressure sensor device according to claim 1, wherein the metal plate includes an outer peripheral portion having a thickness thinner than that on the center side;

a stepped portion in a step-like form from the center side to the outer peripheral portion is formed on the second surface opposite the first surface of the metal plate; and the welded portion is formed on the stepped portion.

* * * * *